United States Patent [19]
Katoh et al.

[11] Patent Number: 5,100,943
[45] Date of Patent: Mar. 31, 1992

[54] PERMANENT ANTISTATIC RESIN COMPOSITION

[75] Inventors: Makoto Katoh; Tetuji Noda, both of Ichihara, Japan

[73] Assignee: Denki Kagaku Kogyo Kabushiki Kaisha, Tokyo, Japan

[21] Appl. No.: 618,880

[22] Filed: Nov. 28, 1990

[30] Foreign Application Priority Data

Nov. 29, 1989 [JP] Japan ................... 1-309485
Jun. 26, 1990 [JP] Japan ................... 2-167543

[51] Int. Cl.⁵ .......................... C08K 5/20; C08K 3/20; C08K 5/10; C08K 5/11
[52] U.S. Cl. .................................. 524/227; 524/230; 524/233; 524/243; 524/310; 524/317; 524/910
[58] Field of Search ............... 524/227, 230, 233, 243, 524/310, 317, 439, 440, 441, 495, 496, 910

[56] References Cited

U.S. PATENT DOCUMENTS

| | | | |
|---|---|---|---|
| 3,585,257 | 6/1971 | Mueller et al. | 525/114 |
| 3,639,519 | 2/1972 | Hsieh et al. | 525/153 |
| 3,691,257 | 9/1972 | Kendrick et al. | 524/37 |
| 3,764,639 | 10/1973 | Hsieh et al. | 525/314 |
| 4,374,031 | 2/1983 | Kudo et al. | 528/45 |
| 4,456,704 | 6/1984 | Fukumura et al. | 521/79 |
| 4,900,785 | 2/1990 | Leitz et al. | 524/148 |

*Primary Examiner*—Paul R. Michl
*Assistant Examiner*—Peter Szekely
*Attorney, Agent, or Firm*—Oblon, Spivak, McClelland, Maier & Neustadt

[57] ABSTRACT

A permanent antistatic resin composition which comprises 100 parts by weight of a block copolymer and from 0.1 to 2.0 parts by weight of an antistatic agent, said block copolymer comprising polymer blocks of a vinyl aromatic compound, polymer blocks of a conjugated diene compound and polymer blocks of a lactone compound, wherein the content of the vinyl aromatic compound is from 10 to 100% by weight and the content of the conjugated diene compound is from 0 to 90% by weight, provided that the sum of the vinyl aromatic compound and the conjugated diene compound is from 30 to 99% by weight, and the content of the lactone compound is from 1 to 70% by weight.

38 Claims, No Drawings

PERMANENT ANTISTATIC RESIN COMPOSITION

The present invention relates to a permanent antistatic resin composition excellent in the heat resistance, transparency and permanent antistatic properties. More particularly, it relates to a permanent antistatic resin composition useful for electronic parts, IC chips, food containers, various dust-proofing materials and molded products, carrier tapes, packaging bags, trays, sheets, flexible discs, containers for storing electronic materials, etc.

Heretofore, it has been common that electronic parts, etc. which are required to avoid static electricity, are accommodated in containers containing carbon or fine metal powder. However, there has been a drawback such that the accommodated articles can not be ascertained due to poor transparency of the containers, or the accommodated products are likely to be stained or contaminated with the powder. Further, in order to impart antistatic properties and transparency, it has been proposed to coat or incorporate an antistatic agent to a resin. However, such a proposal has been found to have a drawback that the incorporated antistatic agent is likely to bleed out to stain the coated particle, or the antistatic properties tend to deteriorate as time passes.

Under these circumstances, the present inventors have conducted extensive research to solve such problems by paying particular attention to lactone compounds block-copolymerizable with a block copolymer of a vinyl aromatic compound and a conjugated diene compound, which is excellent in the moldability and transparency. As a result, it has been found that a resin composition comprising a block copolymer having a certain specific composition and an antistatic agent, and a resin composition comprising such a block copolymer, a styrene resin and an antistatic agent, is excellent in the heat resistance, transparency and permanent antistatic properties.

Thus, the present invention provides a permanent antistatic resin composition which comprises 100 parts by weight of a block copolymer and from 0.1 to 2.0 parts by weight of an antistatic agent, said block copolymer comprising polymer blocks of a vinyl aromatic compound, polymer blocks of a conjugated diene compound and polymer blocks of a lactone compound, wherein the content of the vinyl aromatic compound is from 10 to 100% by weight and the content of the conjugated diene compound is from 0 to 90% by weight, provided that the sum of the vinyl aromatic compound and the conjugated diene compound is from 30 to 99% by weight, and the content of the lactone compound is from 1 to 70% by weight.

The present invention also provides a permanent antistatic resin composition which comprises 100 parts by weight of a resin composition comprising the above-mentioned block copolymer and a styrene resin, and from 0.1 to 2.0 parts by weight of an antistatic agent.

Further, the present invention provides a permanent antistatic resin composition which comprises 100 parts by weight of the above-mentioned block copolymer and from 0.1 to 20 parts by weight an antistatic agent.

Now, the present invention will be described in detail with reference to the preferred embodiments.

The block copolymer to be used in the present invention is a copolymer comprising polymer blocks of a vinyl aromatic compound, polymer blocks of a conjugated diene compound and polymer blocks of a lactone compound, wherein the content of the vinyl aromatic compound is from 10 to 100% by weight and the content of the conjugated diene compound is from 0 to 90% by weight, provided that the sum of the vinyl aromatic compound and the conjugated diene compound is from 30 to 99% by weight, and the content of the lactone compound is from 1 to 70% by weight.

Namely, the content of the vinyl aromatic compound is from 10 to 100% by weight, preferably from 15 to 85% by weight. If the content is less than 10% by weight, the moldability will be poor when the block copolymer is used alone, and when used in combination with a styrene resin, the compatibility tends to be poor, thus leading to a cleavage or delamination phenomenon.

The content of the lactone compound in the block copolymer is from 1 to 70% by weight, preferably from 10 to 70% by weight, more preferably from 10 to 40% by weight. If the content is less than 1% by weight, the effect for preventing the change with time of the antistatic agent tends to be poor. On the other hand, if it exceeds 70% by weight, the heat resistance tends to be low due to the melting point of the lactone compound blocks.

Now, the structure of the block copolymer and the types of linkage will be described.

The structure of the block copolymer to be used in the present invention may be any one of the following types:

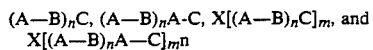

wherein A is a polymer chain made of the vinyl aromatic compound, B is a polymer chain made of the conjugated diene compound, C is a polymer chain made of the lactone compound, n is an integer of from 1 to 20, m is an integer of from 3 to 7, and X is a polyfunctional compound linking m polymer chains. The type of linkage of the block linkage portion composed of the vinyl aromatic compound and the conjugated diene compound used in the present invention, may be a linkage containing at least one so-called tapered structure wherein the two components of the vinyl aromatic compound and the conjugated diene compound are present in a mixed state, or may be a linkage having a so-called clear cut structure wherein the two components are not mixed at all. The block copolymer to be used in the present invention may be the one wherein at least two block copolymers having different molecular weights are mixed, or the one wherein at least two block copolymers having different contents of the vinyl aromatic compound and the conjugated diene compound are mixed. Further, the block copolymer to be used in the present invention may be the one wherein at least two types of different lactone compounds are mixed.

Now, the types of the respective compounds in the block copolymer will be described.

Firstly, the vinyl aromatic compound to be used in the present invention includes, for example, styrene α-methylstyrene, p-methylstyrene and vinyltoluene. Representative among them is styrene. The conjugated diene compound to be used in the present invention includes, for example, butadiene and isoprene. Representative among them is butadiene.

As to the lactone compound to be used in the present invention, there is no particular restriction so long as it is block-copolymerizable with the vinyl aromatic compound and the conjugated diene compound. However, $\beta$- to $\epsilon$-lactone compounds of the following formula:

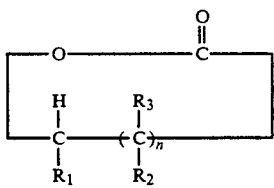

wherein each of $R_1$, $R_2$ and $R_3$ is H, an alkyl group, a cycloalkyl group, an aryl group or an alkoxy group, and n is an integer of from 1 to 5, are preferred. More preferred are the lactone compounds of the following formula:

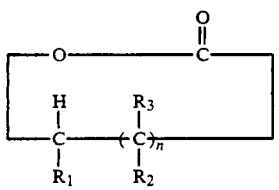

wherein each of $R_1$, $R_2$ and $R_3$ is H or a $C_1$–$C_8$ alkyl group, and n is an integer of from 1 to 5. Specifically, they include $\beta$-propiolactone, dimethylpropiolactone (pivalolactone), butyrolactone, $\gamma$-valerolactone, $\gamma$-caprolactone, $\gamma$-caprylolactone, $\gamma$-laurylolactone, $\delta$-valerolactone, $\delta$-caprolactone and $\epsilon$-caprolactone. Preferred are $\epsilon$-caprolactone and dimethylpropiolactone.

Now, the types of the antistatic agent will be described.

The antistatic agent to be used in the present invention may be the one described in "New Edition of Surfactant Handbook, published Oct. 1, 1987, p.351" which discloses that "internal antistatic agents to be mixed in plastics are usually selected from surfactants, and a surfactant incorporated to a plastic material migrates, after molding, to the plastic surface to form a thin film", and the antistatic properties are evaluated on the basis that "if the surface resistivity is at most $10^{12}$ $\Omega$, the antistatic properties are recognized, and if the surface resistivity is at most $10^9$ $\Omega$, the antistatic properties are regarded to be fairly good". Specific types of the antistatic agent include nonionic, cationic, anionic and quaternary ammonium antistatic agents. Representative among them are an alkylpolyoxyethyleneamine and a sorbitan ester. The antistatic agent is incorporated in an amount of from 0.1 to 2.0 parts by weight, preferably from 0.1 to 1.0 part by weight, more preferably from 0.3 to 1.0 part by weight, per 100 parts by weight of the block copolymer. If the amount is less than 0.1 part by weight, no adequate effect for antistatic properties will be imparted to the molded products. On the other hand, if it exceeds 2.0 parts by weight, the antistatic agent tends to bleed out on the surface of the molded products, such being undesirable.

The permanent antistatic resin composition of the present invention is such that the surface resistivity of the surface of a molded product obtained by molding such a resin composition is within a range of from $10^9$ to $10^{12}$ $\Omega$, and the surface resistivity immediately after the molding and after washing with water remains to be within a range of from $10^9$ to $10^{12}$ $\Omega$.

Then, the present invention provides a permanent antistatic resin composition which comprises 100 parts by weight of a resin composition comprising a block copolymer and a styrene resin, and from 0.1 to 2.0 parts by weight of an antistatic agent, said block copolymer comprising polymer blocks of a vinyl aromatic compound, polymer blocks of a conjugated diene compound and polymer blocks of a lactone compound, wherein the content of the vinyl aromatic compound is from 10 to 100% by weight and the content of the conjugated diene compound is from 0 to 90% by weight, provided that the sum of the vinyl aromatic compound and the conjugated diene compound is from 30 to 99% by weight, and the content of the lactone compound is from 1 to 70% by weight.

The styrene resin to be used in the present invention includes, for example, a general purpose polystyrene resin, a styrene-butadiene graft copolymer resin, a styrene-butadiene block copolymer resin, a styrene-isoprene block copolymer resin and hydrides of the above-mentioned respective block copolymer resins, and styrene-methyl methacrylate resins including a styrene-methyl methacrylate copolymer resin and a resin composition comprising a styrene-methyl methacrylate copolymer resin and a butadiene graft copolymer resin.

With respect to the proportions of the block copolymer and the styrene resin in the resin composition of the present invention, it is preferred to use the block copolymer within a range of from 10 to 90% weight and the styrene resin within a range of from 10 to 90% by weight. If the proportion of the styrene resin exceeds 90% by weight, the effects for the antistatic properties tend to decrease.

Further, the block copolymer to be used in the present invention may be the same as mentioned above.

Further, the antistatic agent to be used in the present invention may be the same as described above, and its proportion is usually from 0.1 to 2.0 parts by weight, preferably from 0.1 to 1.0 part by weight, more preferably from 0.3 to 1.0 part by weight, relative to 100 parts by weight of the resin composition. If the proportion of the antistatic agent is less than 0.1 part by weight, no adequate antistatic effects will be imparted to the molded product. If it exceeds 2.0 parts by weight, the antistatic agent tends to bleed out on the surface of the molded product, such being undesirable.

As a method for preparing the resin composition of the present invention comprising the block copolymer, the styrene resin and the antistatic agent, any one of the following methods may be employed:

(1) A method which comprises mixing three components of the block copolymer, the styrene resin and the antistatic agent and forming the mixture into uniform pellets by an extruder;

(2) A method which comprises preparing a uniform resin composition of the block copolymer and the styrene resin, then mixing an antistatic agent thereto, and forming the mixture into uniform pellets; and (3) A method which comprises preparing a uniform resin composition of the block copolymer and the antistatic agent, then mixing the styrene resin thereto, and forming the mixture into uniform pellets.

In the case of the above method (3), the ratio of the antistatic agent to the block copolymer of the present invention is usually from 0.1 to 20 parts by weight, preferably from 0.1 to 10 parts by weight, more preferably from 0.3 to 10 parts by weight, to 100 parts by weight of the block copolymer.

The block copolymer resin composition containing an antistatic agent according to the present invention undergoes no substantial deterioration of the antistatic properties by washing with water or by wiping off of the surface, as is different from the conventional antistatic resins. Likewise, the resin composition comprising the block copolymer, the styrene resin and the antistatic agent undergoes no substantial deterioration of the antistatic properties by washing with water or by wiping off of the surface.

The antistatic resin composition of the present invention may be applied to containers for IC chips, carrier tapes, packaging bags, shrink films, trays, flexible disc cases, various dust-proofing materials and molded products and cases for storing electronic materials.

As described in the foregoing, the present invention provides a resin composition excellent in the antistatic properties and permanent antistatic properties.

Now, the present invention will be described in further detail with reference to Examples. In the Tables given hereinafter, "wt %" means "% by weight", "PHR" represents "parts by weight added per 100 parts by weight of the block copolymer or the resin composition".

EXAMPLE 1

To 100 parts by weight of a block copolymer having a styrene content of 70% by weight, a butadiene content of 25% by weight and an $\epsilon$-caprolactone content of 5% by weight prepared by process (a) given hereinafter, 0.2 part by weight of hindered phenol type antioxidant, 0.3 part by weight of a phosphorus type antioxidant, 0.2 part by weight of a fatty acid ester type lubricant and 1.0 part by weight of an antistatic agent (Electrostripper EA, tradename, manufactured by Kao Corporation, hereinafter referred to as antistatic agent EA) were mixed, and the mixture was extruded by a 40 mm$\phi$ extruder to obtain uniform pellets. The obtained pellets were molded by a 2 oz injection molding machine into a square plate of 10 cm×10 cm×2 mm. Evaluation of the transparency, surface resistivity and strength of the molded product was conducted, and the results are shown in Table 1. The transparency, the antistatic properties and the maintenance of the antistatic properties by washing with water were all excellent.

(a) Process for Producing the Block Copolymer

Into an autoclave having a capacity of 100 l, 75 l of purified benzene and 7.0 kg of styrene were charged and stirred. Then, 0.24 mol of n-butyl lithium was added at a temperature of 30° C., and the reaction was conducted at 40° C. for 30 minutes to complete the polymerization. Then, 5.0 kg of butadiene was charged, and the temperature was raised to complete the polymerization. Then, 7.0 kg of styrene was charged, and the temperature was raised to complete the polymerization. Then, 40 g of $\epsilon$-caprolactone was charged, and the reaction was conducted at a temperature of 60° C. for 10 minutes. Then, 0.96 kg of $\epsilon$-caprolactone was further charged, and the reaction was conducted at 60° C. for 60 minutes to complete the polymerization. Finally, benzene was removed by steam distillation, and then the polymer slurry was dehydrated and dried.

EXAMPLE 2

A block copolymer having a styrene content of 72% by weight, a butadiene content of 25% by weight and an $\epsilon$-caprolactone content of 3% by weight prepared in accordance with the process for producing the block copolymer as described in Example 1 except that the points identified in the following (b) were changed, was used, and using the pellets thereby obtained, the operation was conducted in the same manner as in Example 1, and the physical properties were measured. The results are shown in Table 1. The transparency, the antistatic properties and the maintenance of the antistatic properties by washing with water were all excellent.

(b) Process for Producing the Block Copolymer

Amount of styrene charged first: 7.5 kg
Amount of butadiene charged second time: 5.0 kg
Amount of styrene charged third time: 7.44 kg
Amount of $\epsilon$-caprolactone charged fifth time: 560 g

EXAMPLE 3

A block copolymer having a styrene content of 60% by weight, a butadiene content of 25% by weight and an $\epsilon$-caprolactone content of 15% by weight prepared by the process for producing the block copolymer as described in Example 1 except that the points identified in the following (c) were changed, was used, and using the pellets thereby obtained, the operation was conducted in the same manner as in Example 1. The physical properties were measured. The results are shown in Table 1.

The transparency, the antistatic properties and the maintenance of the antistatic properties by washing with water were all excellent.

(c) Process for Producing the Block Copolymer

Amount of styrene charged first: 6.0 kg
Amount of butadiene charged second time: 5.0 kg
Amount of styrene charged third time: 6.0 kg
Amount of $\epsilon$-caprolactone charged fifth time: 2.96 kg

EXAMPLE 4

To 100 parts by weight of the block copolymer prepared in Example 1, 0.2 part by weight of a hindered phenol type antioxidant, 0.3 part by weight of a phosphorus type antioxidant, 0.2 part by weight of a fatty acid ester type lubricant and 0.3 part by weight of the antistatic agent EA were mixed, and the mixture was extruded by a 40 mm$\phi$ extruder to obtain uniform pellets. Then, using the pellets thus obtained, the operation was conducted in the same manner as in Example 1, and the physical properties were measured. The results are shown in Table 1.

The transparency, the antistatic properties and the maintenance of the antistatic properties by washing with water were all excellent.

EXAMPLE 5

A block copolymer having a styrene content of 80% by weight, a butadiene content of 15% by weight and an $\epsilon$-caprolactone content of 5% by weight prepared in accordance with the process for producing the block copolymer as described in Example 1 except that the points identified in the following (d) were changed, was used, and using the pellets thereby obtained, the operation was conducted in the same manner as in Example 1, and the physical properties were measured. The results are shown in Table 1.

The transparency, the antistatic properties and the maintenance of the antistatic properties by washing with water were all excellent.

(d) Process for Producing the Block Copolymer

Amount of styrene charged first: 8.0 kg
Amount of butadiene charged second time: 3.0 kg
Amount of styrene charged third time: 8.0 kg
Amount of ε-caprolactone charged fifth time: 0.96 kg

EXAMPLE 6

A block copolymer having a styrene content of 84% by weight, a butadiene content of 15% by weight and an ε-caprolactone content of 1% by weight prepared in accordance with the process for producing the block copolymer as described in Example 1 except that the points identified in the following (e) were changed, was used, and using the pellets thereby obtained, the operation was conducted in the same manner as in Example 1, and the physical properties were measured. The results are shown in Table 1.

The transparency, the antistatic properties and the maintenance of the antistatic properties by washing with water were all excellent.

(e) Process for Producing the Block Copolymer

Amount of styrene charged first: 7.4 kg
Amount of butadiene charged second time: 5.0 kg
Amount of styrene charged third time: 7.4 kg
Amount of ε-caprolactone charged fifth time: 160 g

EXAMPLE 7

A block copolymer having a styrene content of 35% by weight, a butadiene content of 60% by weight and an ε-caprolactone content of 5% by weight prepared in accordance with the process for producing the block copolymer as described in Example 1 except that the points identified in the following (f) were changed, was used, and using the pellets thereby obtained, the operation was conducted in the same manner as in Example 1, and the physical properties were measured. The results are shown in Table 1.

The transparency, the antistatic properties and the maintenance of the antistatic properties by washing with water were all excellent.

(f) Process for Producing the Block Copolymer

Amount of styrene charged first: 3.5 kg
Amount of butadiene charged second time: 12.0 kg
Amount of styrene charged third time: 3.5 kg
Amount of ε-caprolactone charged fifth time: 960 g

EXAMPLE 8

A block copolymer having a styrene content of 55% by weight, a butadiene content of 25% by weight and an ε-caprolactone content of 20% by weight prepared in accordance with the process for producing the block copolymer as described in Example 1 except that the points identified in the following (g) were changed, was used, and using the pellets thereby obtained, the operation was conducted in the same manner as in Example 1, and the physical properties were measured. The results are shown in Table 1.

The transparency, the antistatic properties and the maintenance of the antistatic properties by washing with water were all excellent.

(g) Process for Producing the Block Copolymer

Amount of styrene charged first: 5.5 kg
Amount of butadiene charged second time: 5.0 kg
Amount of styrene charged third time: 5.5 kg
Amount of ε-caprolactone charged fifth time: 3.96 kg

EXAMPLE 9

To 100 parts by weight of a block copolymer having a styrene content of 80% by weight and an ε-caprolacton content of 20% by weight prepared by process (h) given hereinafter, 0.2 part by weight of a hindered phenol type antioxidant, 0.3 part by weight of a phosphorus type antioxidant, 0.2 part by weight of a fatty acid ester type lubricant and 1.0 part by weight of the antistatic agent EA were mixed, and the mixture was molded by a 100 t press into a square plate of 10 cm×10 cm×2 mm, and the physical properties were measured. The results are shown in Table 1.

The antistatic properties and the maintenance of the antistatic properties by washing with water were excellent.

(h) Process for Producing the Block Copolymer

Into an autoclave having a capacity of 100 l, 75 l of benzene and 8.0 kg of styrene were charged and stirred. Then, 0.03 mol of n-butyl lithium was added at a temperature of 30° C., and the reaction was conducted at 40° C. for 30 minutes to complete the polymerization. Then, 8.0 kg of styrene was again charged, and the reaction was conducted at 40° C. for 30 minutes to complete the polymerization. Then, 40 g of ε-caprolactone was charged, and the reaction was conducted at 60° C. for 10 minutes. Further, 3.96 kg of ε-caprolactone was charged, and the reaction was conducted at 60° C. for 60 minutes to complete the polymerization. Finally, benzene was removed by steam distillation, and then the polymer slurry was dehydrated and dried.

COMPARATIVE EXAMPLE 1

To 95 parts by weight of a styrene-butadiene-styrene block copolymer having a butadiene content of 25% by weight prepared by process (i) as described hereinafter and 5 parts by weight of a polymer of ε-caprolactone (Plarkcel H-7, tradename, manufactured by Daicel Chemical Industries, Ltd.), 0.2 part by weight of a hindered phenol type antioxidant, 0.3 part by weight of a phosphorus type antioxidant, 0.2 part by weight of a fatty acid ester type lubricant and 1.0 part by weight of the antistatic agent EA were mixed, and the mixture was 10 extruded by a 40 mmφ extruder to obtain uniform pellets. Then, using the pellets thereby obtained, the operation was conducted in the same manner as in Example 1, and the physical properties were measured. The results are shown in Table 2.

The maintenance of the antistatic properties by washing with water and the transparency were remarkably inferior, and cleavage was observed.

(i) Process for Producing the Block Copolymer

Into an autoclave having a capacity of 100 l, 75 l of benzene and 7.5 kg of styrene were charged and stirred. Then, 0.13 mol of n-butyl lithium was added at a temperature of 30° C., and the reaction was conducted at 40° C. for 30 minutes to complete the polymerization. Then, 5.0 kg of butadiene was charged, and the temperature was raised to complete the polymerization. Then, 7.5 kg of styrene was charged, and the temperature was raised to complete the polymerization. Finally, benzene was removed by steam distillation, and the polymer slurry was dehydrated and dried.

COMPARATIVE EXAMPLE 2

To 100 parts by weight of the block copolymer prepared in Comparative Example 1, 0.2 part by weight of a hindered phenol type antioxidant, 0.3 part by weight of a phosphorus type antioxidant, 0.2 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 2.

The transparency was good, but the antistatic properties, particularly the maintenance of the antistatic properties by washing with water, was inferior.

COMPARATIVE EXAMPLE 3

A block copolymer having a styrene content of 5% by weight, a butadiene content of 93% by weight and an ε-caprolactone content of 2% by weight, prepared in accordance with the process for producing the block copolymer as described in Example 1 except that the points in the following (j) were changed, was used, and using the pellets thereby obtained, the operation was conducted in the same manner as in Example 1, and the physical properties were measured. The results are shown in Table 2.

The heat resistance remarkably deteriorated, and due to the stickiness, molding was impossible. Accordingly, no evaluation was possible.

(j) Process for Producing the Block Copolymer

Amount of styrene charged first: 0.5 kg
Amount of butadiene charged second time: 18.6 kg
Amount of styrene charged third time: 0.5 kg
Amount of ε-caprolactone charged fifth time: 360 g

COMPARATIVE EXAMPLE 4

To 100 parts by weight of the block copolymer prepared in Example 1, 0.2 part by weight of a hindered phenol type antioxidant, 0.3 part by weight of a phosphorus type antioxidant, 0.2 part by weight of a fatty acid ester type lubricant were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 2.

The transparency was good, but the antistatic properties were inferior.

EXAMPLE 10

To 80% by weight of the block copolymer prepared in Example 1 and 20% by weight of the styrene type resin GP-PS (Denka styrol GP-1, hereinafter referred to as GP-PS, manufactured by Denki Kagaku Kogyo Kabushiki Kaisha), 0.16 part by weight of a hindered phenol type antioxidant, 0.24 part by weight of a phosphorus type antioxidant, 0.12 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 3.

The transparency, the antistatic properties and the maintenance of the antistatic properties by washing with water were all excellent.

EXAMPLE 11

To 60% by weight of the block copolymer prepared in Example 1 and 40% by weight of the styrene type resin GP-PS, 0.12 part by weight of a hindered phenol type antioxidant, 0.18 part by weight of a phosphorus type antioxidant, 0.1 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 3.

The transparency, the antistatic properties and the maintenance of the antistatic properties by washing with water were all excellent.

EXAMPLE 12

To 40% by weight of the block copolymer prepared in Example 1 and 60% by weight of the styrene type resin GP-PS, 0.08 part by weight of a hindered phenol type antioxidant, 0.12 part by weight of a phosphorus type antioxidant, 0.06 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 3.

The transparency, the antistatic properties and the maintenance of the antistatic properties by washing with water were all excellent.

EXAMPLE 13

To 80% by weight of the block copolymer prepared in Example 1 and 20% by weight of the styrene type resin HI-PS (Denka styrol HI-S-2, hereinafter referred to as HI-PS, manufactured by Denki Kagaku Kogyo Kabushiki Kaisha), 0.16 part by weight of a hindered phenol type antioxidant, 0.24 part by weight of a phosphorus type antioxidant, 0.12 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 3.

The antistatic properties and the maintenance of the antistatic properties by washing with water were excellent.

EXAMPLE 14

To 60% by weight of the block copolymer prepared in Example 1 and 40% by weight of the styrene type resin HI-PS, 0.12 part by weight of a hindered phenol type antioxidant, 0.18 part by weight of a phosphorus type antioxidant, 0.1 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 3.

The antistatic properties and the maintenance of the antistatic properties by washing with water were excellent.

EXAMPLE 15

To 40% by weight of the block copolymer prepared in Example 1 and 60% by weight of the styrene type resin HI-PS, 0.08 part by weight of a hindered phenol type antioxidant, 0.12 part by weight of a phosphorus type antioxidant, 0.06 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 3.

The antistatic properties and the maintenance of the antistatic properties by washing with water were excellent.

EXAMPLE 16

To 70% by weight of the block copolymer prepared in Example 1 and 15% by weight of the styrene type resin GP-PS and 15% by weight of HI-PS, 0.14 part by weight of a hindered phenol type antioxidant, 0.21 part by weight of a phosphorus type antioxidant, 0.11 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results ar shown in Table 3.

The antistatic properties and the maintenance of the antistatic properties by washing with water were excellent.

EXAMPLE 17

To 50% by weight of the block copolymer prepared in Example 1 and 25% by weight of the styrene type resin GP-PS and 25% by weight of HI-PS, 0.10 part by weight of a hindered phenol type antioxidant, 0.15 part by weight of a phosphorus type antioxidant, 0.08 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 3.

The antistatic properties and the maintenance of the antistatic properties by washing with water were excellent.

EXAMPLE 18

To 50% by weight of the block copolymer prepared in Example 1 and 30% by weight of the styrene type resin GP-PS and 20% by weight of a styrene-butadiene block copolymer resin (Clearene 730L, hereinafter referred to simply as SBS block copolymer resin, manufactured by Denki Kagaku Kogyo Kabushiki Kaisha), 0.10 part by weight of a hindered phenol type antioxidant, 0.15 part by weight of a phosphorus type antioxidant, 0.08 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 4.

The antistatic properties and the maintenance of the antistatic properties by washing with water were excellent.

EXAMPLE 19

To 80% by weight of the block copolymer prepared in Example 1 and 20% by weight of the styrene type resin SBS block copolymer resin, 0.16 part by weight of a hindered phenol type antioxidant, 0.24 part by weight of a phosphorus type antioxidant, 0.12 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 4.

The antistatic properties and the maintenance of the antistatic properties by washing with water were excellent.

EXAMPLE 20

To 80% by weight of the block copolymer prepared in Example 1 and 20% by weight of the block copolymer resin having a styrene content of 75% by weight and an isoprene content of 25% by weight prepared by process (k) as described hereinafter, 0.20 part by weight of a hindered phenol type antioxidant, 0.24 part by weight of a phosphorus type antioxidant, 0.12 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 4.

The antistatic properties and the maintenance of the antistatic properties by washing with water were excellent.

(k) Process for Producing the Block Copolymer

Into an autoclave having a capacity of 100 l, 75 l of benzene and 7.5 kg of styrene were charged and stirred. Then, 0.24 mol of n-butyl lithium was added at a temperature of 30° C., and the reaction was conducted at 40° C. for 30 minutes to complete the polymerization. Then, 5.0 kg of isoprene was charged, and the temperature was raised to complete the polymerization. Then, 7.5 kg of styrene was charged, and the temperature was raised to complete the polymerization. Finally, benzene was removed by steam distillation, and the polymer slurry was dehydrated and dried.

EXAMPLE 21

To 90% by weight of the block copolymer prepared in Example 1 and 10% by weight of the hydrate of the styrene type resin SBS block copolymer resin (Toughtech H 1041, manufactured by Asahi Kasei Co., Ltd.), 0.20 part by weight of a hindered phenol type antioxidant, 0.30 part by weight of a phosphorus type antioxidant, 0.15 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 4.

The antistatic properties and the maintenance of the antistatic properties by washing with water were excellent.

EXAMPLE 22

To 80% by weight of a block copolymer having a styrene content of 70% by weight, a butadiene content of 25% by weight and a dimethylpropiolactone (pivalolactone) content of 5% by weight prepared by process (l) as described hereinafter and 20% by weight of the styrene type resin GB-PS, 0.20 part by weight of a hindered phenol type antioxidant, 0.30 part by weight of a phosphorus type antioxidant, 0.15 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 4.

The antistatic properties and the maintenance of the antistatic properties by washing with water were excellent.

(l) Process for Producing the Block Copolymer

Into an autoclave having a capacity of 100 l, 75 l of benzene and 7.0 kg of styrene were charged and stirred. Then, 0.24 mol of n-butyl lithium was added at a temperature of 30° C., and the reaction was conducted at 40° C. for 30 minutes to complete the polymerization. Then, 5.0 kg of butadiene was charged, and the temperature was raised to complete the polymerization. Then, 7.5 kg of styrene was charged, and the temperature was raised to complete the polymerization. Then, 1.0 kg of pivalolactone was charged, and the reaction was conducted at room temperature for 24 hours to complete the polymerization. Finally, benzene was removed by steam distillation, and the polymer slurry was dehydrated and dried.

EXAMPLE 23

To 100% by weight of the block copolymer prepared in Example 1, 0.20 part by weight of a hindered phenol type antioxidant, 0.15 part by weight of a phosphorus type antioxidant, 0.08 part by weight of a fatty acid ester type lubricant and 1.0 part by weight of an antistatic agent (Rikemal O-71DE, manufactured by Riken Vitamin K.K.) were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 4.

The transparency, the antistatic properties and the maintenance of the antistatic properties by washing with water were all excellent.

EXAMPLE 24

To 90% by weight of the block copolymer prepared in Example 1, and 10% by weight of a hydrate of a styrene-isoprene block copolymer resin as a styrene type resin (KL-2023, manufactured by Kuraray Co., Ltd.), 0.18 part by weight of a hindered phenol type antioxidant, 0.27 part by weight of a phosphorus type antioxidant, 0.14 part by weight of a fatty acid ester type lubricant and 1.0 part by weight of the antistatic agent EA were mixed, and the mixture was extruded by a 40 mm$\phi$ extruder to obtain uniform pellets. Then, using the pellets thereby obtained, the operation was conducted in the same manner as in Example 1, and the physical properties were measured The results are shown in Table 4.

The antistatic properties and the maintenance of the antistatic properties by washing with water were excellent.

EXAMPLE 25

To 30% by weight of a block copolymer having a styrene content of 65% by weight, a butadiene content of 10% by weight, an $\epsilon$-caprolactone content of 25% by weight prepared by process (m) as described hereinafter and 70% by weight of a styrene-methyl methacrylate copolymer resin (hereinafter referred to as MS resin) prepared by process (A) as described hereinafter, 0.12 part by weight of a hindered phenol type antioxidant 0.15 part by weight of a phosphorus type antioxidant, 0.16 part by weight of a fatty acid ester type lubricant and 1.0 part by weight of an antistatic agent (Electrostripper EA, hereinafter referred to as the antistatic agent EA, tradename, manufactured by Kao Corporation) were mixed, and the mixture was extruded by a 40 mm$\phi$ extruder to obtain uniform pellets. Then, using the pellets thereby obtained, the operation was conducted in the same manner as in Example 1, and the physical properties were measured. The results are shown in Table 5.

The transparency, the permanent antistatic properties and the compatibility were all excellent.

(m) Process for Producing the Block Copolymer

Into an autoclave having a capacity of 100 l, 75 l of benzene and 6.5 kg of styrene were charged and stirred. Then, 0.13 mol of n-butyl lithium was added at a temperature of 30° C., and the reaction was conducted at 40° C. for 30 minutes to complete the polymerization. Then, 2.0 kg of butadiene was charged, and the temperature was raised to complete the polymerization. Then, 6.5 kg of styrene was charged, and the temperature was raised to complete the polymerization. Then, 40 g of $\epsilon$-caprolactone was charged, and the reaction was conducted at a temperature of 70° C. for 10 minutes, and 4.96 kg of $\epsilon$-caprolactone was further charged, and the reaction was conducted at 70° C. for 60 minutes to complete the polymerization. Finally, benzene was removed by steam distillation, and the polymer slurry was dehydrated and dried.

(A) Process for Producing the MS Resin

Into an autoclave having an internal capacity of 100 l, 40 kg of pure water, 300 g of calcium tertiary phosphate and 0.2 g of sodium dodecylbenzene sulfonate were added and stirred at a rotational speed of 200 rpm. Then, 28.0 kg of styrene monomer, 0.70 kg of methyl methacrylate and 130 g of benzoyl peroxide were added, and the mixture was sealed with nitrogen and heated to 90° C. The mixture was maintained at 90° C. for 5 hours, then at 115° C. for 2 hours and further at 130° C. for 2 hours to complete the polymerization. The reaction mixture was cooled and then neutralized, dehydrated and dried by usual method. Then, the mixture was extruded by an extruder to obtain pellets.

EXAMPLE 26

To 80% by weight of a block copolymer having a styrene content of 65% by weight, a butadiene content of 25% by weight and an ε-caprolactone content of 10% by weight prepared in accordance with the process for producing the block copolymer as described in Example 1 except that the points of the following (n) were changed and 20% by weight of a composition (hereinafter referred to as MBS resin) comprising a styrene-methyl methacrylate copolymer resin and a butadiene graft copolymer resin, prepared by process (B) as described hereinafter, 0.32 part by weight of a hindered phenol type antioxidant, 0.40 part by weight of a phosphorus type antioxidant, 0.16 part by weight of a fatty acid ester type lubricant and 1.0 part by weight of the antistatic agent EA were mixed, and the mixture was extruded by a 40 mmφ extruder to obtain uniform pellets. Then, using the pellets thereby obtained, the operation was conducted in the same manner as in Example 1, and the physical properties were measured. The results are shown in Table 5.

The transparency, the permanent antistatic properties and the compatibility were all excellent.

(n) Process for Producing the Block Copolymer

Amount of styrene charged first: 6.5 kg
Amount of butadiene charged second time: 5.0 kg
Amount of styrene charged third time: 6.5 kg
Amount of ε-caprolactone charged fifth time: 1.96 kg (B) Process for producing the MBS resin 250 g of polybutadiene having no substantial cross linking was dissolved in a mixture comprising 2.375 kg of styrene monomer and 2.375 kg of methyl methacrylate to obtain a rubber monomer solution (a). The monomer solution (a) was introduced into a 10 l autoclave, and 10 g of benzoyl peroxide was added thereto and uniformly dissolved. Then, the polymerization was conducted at a rotational speed of 400 rpm at 70° C. for 6 hours to obtain a prepolymer (b) having a degree of polymerization of 14.5%. On the other hand, in a 20 l autoclave for suspension polymerization, 50 g of a sodium salt of polyacrylic acid and 20 g of sodium hydrogencarbonate were dissolved in 10 kg of pure water. To the above prepolymer (b), 15 g of benzoyl peroxide was uniformly dissolved and the solution was added to the above 20 l autoclave and stirred at a rotational speed of 500 rpm. After confirming that the prepolymer (b) was suspended in water, polymerization was conducted at 93° C. for 7 hours. After completion of the polymerization, polymer beads were collected by filtration, washed with water and dried and then extruded by an extruder to obtain pellets.

EXAMPLE 27

To 80% by weight of the block copolymer and 20% by weight of the MS resin prepared in Example 26, 0.32 part by weight of a hindered phenol type antioxidant, 0.40 part by weight of a phosphorus type antioxidant, 0.16 part by weight of a fatty acid ester type lubricant and 1.0 part by weight of the antistatic agent EA were mixed, and the mixture was extruded by a 40 mmφ extruder to obtain uniform pellets. Then, using the pellets thereby obtained, the operation was conducted in the same manner as in Example 1, and the physical properties were measured. The results are shown in Table 5.

The transparency, the permanent antistatic properties and the compatibility were all excellent.

EXAMPLE 28

The test was conducted in the same manner as in Example 1 except that 10% by weight of the block copolymer and 90% by weight of the MBS resin prepared in Example 25 were employed. The results are shown in Table 5.

The transparency, the permanent antistatic properties and the compatibility were all excellent.

COMPARATIVE EXAMPLE 5

To 72% by weight of the SBS block copolymer having a styrene content of 75% by weight and a butadiene content of 25% by weight prepared in Comparative Example 1, 8% by weight of a polymer of ε-caprolactone (Plarkcel H-7, tradename, manufactured by Daicel Chemical Industries, Ltd.) and 20% by weight of the MS resin, 0.32 part by weight of a hindered phenol type antioxidant, 0.40 part by weight of a phosphorus type antioxidant, 0.16 part by weight of a fatty acid ester type lubricant and 1.0 part by weight of the antistatic agent EA were mixed, and the mixture was extruded by a 40 mmφ extruder to obtain uniform pellets. Then, using the pellets thereby obtained, the operation was conducted in the same manner as in Example 1, and the physical properties were measured. The results are shown in Table 6.

The antistatic properties were good, but the transparency and the compatibility were remarkably inferior.

COMPARATIVE EXAMPLE 6

A block copolymer having a styrene content of 10% by weight, a butadiene content of 80% by weight and an ε-caprolactone content of 10% by weight prepared in accordance with the process for producing the block copolymer as described in Example 1 except that the points in the following (o) were changed, was used, and using the pellets thereby obtained, the operation was conducted in the same manner as in Example 1, and the physical properties were measured. The results are shown in Table 6.

Deterioration of the heat resistance and transparency was remarkable, and the product was hardly practically useful.

(o) Process for Producing the Block Copolymer

Amount of styrene charged first: 1.0 kg
Amount of butadiene charged second time: 16.0 kg
Amount of styrene charged third time: 1.0 kg
Amount of ε-caprolactone charged fifth time: 1.96 kg

COMPARATIVE EXAMPLE 7

A block copolymer having a styrene content of 10% by weight, a butadiene content of 10% by weight and an ε-caprolactone content of 80% by weight prepared in accordance with the process for producing the block copolymer as described in Example 1 except that the points in the following (p) were changed, was used, and using the pellets thereby obtained, the operation was conducted in the same manner as in Example 1, and the physical properties were measured. The results are shown in Table 6.

Deterioration of the heat resistance and transparency was remarkable, and the product was hardly practically useful.

(p) Process for Producing the Block Copolymer
Amount of styrene charged first: 1.0 kg
Amount of butadiene charged second time: 1.0 kg
Amount of styrene charged third time: 1.0 kg
Amount of ε-caprolactone charged fifth time: 15.96 kg

COMPARATIVE EXAMPLE 8

The test was conducted in the same manner as in Comparative Example 5 except that 80% by weight of the block copolymer prepared in Comparative Example 1 and 20% by weight of the MS resin were employed. The results are shown in Table 6.

The permanent antistatic properties were remarkably inferior.

COMPARATIVE EXAMPLE 9

The test was conducted in the same manner as in Comparative Example 5 except that 80% by weight of the block copolymer prepared in Comparative Example 1 and 20% by weight of the MBS resin were used. The results are shown in Table 6.

The permanent antistatic properties were remarkably inferior.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Block copolymer | Styrene content of block copolymer (wt %) | 70 | 72 | 60 | 70 | 80 | 84 | 35 | 55 | 80 |
| | Butadiene content of block copolymer (wt %) | 25 | 25 | 25 | 25 | 15 | 15 | 60 | 25 | — |
| | Lactone content of block copolymer (wt %) | 5 | 3 | 15 | 5 | 5 | 1 | 5 | 20 | 20 |
| Content of antistatic agent (PHR) | | 1.0 | 1.0 | 1.0 | 0.3 | 1.0 | 1.0 | 1.0 | 1.0 | 1.0 |
| Physical properties | Haze (%) | 7.9 | 6.3 | 8.5 | 7.2 | 5.3 | 6.0 | 23.2 | 16.7 | 3.4 |
| | Surface resistivity (blank) (Ω) | $1.3 \times 10^{10}$ | $3.0 \times 10^{10}$ | $1.1 \times 10^{9}$ | $4.2 \times 10^{10}$ | $5.6 \times 10^{10}$ | $2.4 \times 10^{10}$ | $4.6 \times 10^{10}$ | $1.0 \times 10^{9}$ | $6.3 \times 10^{10}$ |
| | Surface resistivity (after wiping water off) (Ω) | $2.5 \times 10^{10}$ | $3.5 \times 10^{10}$ | $2.7 \times 10^{10}$ | $8.9 \times 10^{11}$ | $8.4 \times 10^{10}$ | $5.3 \times 10^{11}$ | $7.3 \times 10^{10}$ | $8.4 \times 10^{9}$ | $9.2 \times 10^{10}$ |
| | Vicat softening point (°C.) | 66 | 65 | 54 | 66 | 68 | 69 | 48 | 50 | 72 |
| | Notched Izod impact strength (kg-cm/cm) | 2.2 | 2.1 | 2.6 | 2.1 | 2.0 | 2.0 | Not broken | 2.8 | 0.9 |

TABLE 2

| | | Comparative Example 1 | Comparative Example 2 | Comparative Example 3 | Comparative Example 4 |
|---|---|---|---|---|---|
| Block copolymer | Styrene content of block copolymer (wt %) | 75 | 75 | 5 | 70 |
| | Butadiene content of block copolymer (wt %) | 25 | 25 | 93 | 25 |
| | Lactone content of block copolymer (wt %) | — | — | 2 | 5 |
| Polylactone content in the resin composition (wt %) | | 5 | — | — | — |
| Content of antistatic agent (PHR) | | 1.0 | 1.0 | 1.0 | — |
| Physical properties | Haze (%) | 93.4 | 3.6 | Not molded | 7.6 |
| | Surface resistivity (blank) (Ω) | $2.4 \times 10^{10}$ | $4.2 \times 10^{14}$ | — | $4.5 \times 10^{15}$ |
| | Surface resistivity (after wiping water off) (Ω) | $5.3 \times 10^{15}$ | $8.9 \times 10^{15}$ | — | $5.6 \times 10^{15}$ |
| | Vicat softening point (°C.) | 63 | 80 | — | 67 |
| | Notched Izod impact strength (kg-cm/cm) | 2.2 | 2.0 | — | 2.2 | the block copolymer prepared in Comparative Example

TABLE 3

| | | Example 10 | Example 11 | Example 12 | Example 13 | Example 14 | Example 15 | Example 16 | Example 17 |
|---|---|---|---|---|---|---|---|---|---|
| Block copolymer | Styrene content of block copolymer (wt %) | 70 | 70 | 70 | 70 | 70 | 70 | 70 | 70 |
| | Butadiene content of block copolymer (wt %) | 25 | 25 | 25 | 25 | 25 | 25 | 25 | 25 |
| | Lactone content of block copolymer (wt %) | 5 | 5 | 5 | 5 | 5 | 5 | 5 | 5 |
| Content of block copolymer in the resin composition (wt %) | | 80 | 60 | 40 | 80 | 60 | 40 | 70 | 50 |
| Styrene type resin | Content of GP-PS in the resin composition (wt %) | 20 | 40 | 60 | — | — | — | 15 | 25 |
| | Content of HI-PS in the resin composition (wt %) | — | — | — | 20 | 40 | 60 | 15 | 25 |
| Content of antistatic agent (PHR) | | 1.0 | 1.0 | 1.0 | 1.0 | 1.0 | 1.0 | 1.0 | 1.0 |
| Physical properties | Haze (%) | 7.9 | 6.3 | 5.4 | — | — | — | 40.3 | 58.2 |
| | Surface resistivity (blank) (Ω) | $1.5 \times 10^{10}$ | $3.0 \times 10^{10}$ | $5.8 \times 10^{10}$ | $1.5 \times 10^{10}$ | $2.3 \times 10^{10}$ | $5.6 \times 10^{10}$ | $2.2 \times 10^{10}$ | $4.3 \times 10^{10}$ |
| | Surface resistivity (after | $5.6 \times$ | $3.5 \times$ | $8.4 \times$ | $2.6 \times$ | $3.4 \times$ | $1.1 \times$ | $3.6 \times$ | $8.9 \times$ |

TABLE 3-continued

|  | Example 10 | Example 11 | Example 12 | Example 13 | Example 14 | Example 15 | Example 16 | Example 17 |
|---|---|---|---|---|---|---|---|---|
| wiping water off) ($\Omega$) | $10^{10}$ | $10^{11}$ | $10^{11}$ | $10^{10}$ | $10^{10}$ | $10^{11}$ | $10^{10}$ | $10^{10}$ |
| Vicat softening point (°C.) | 74 | 81 | 86 | 67 | 78 | 85 | 75 | 80 |
| Notched Izod impact strength (kg-cm/cm) | 2.0 | 2.0 | 1.4 | 6.1 | 9.9 | 8.8 | 4.0 | 6.2 |

TABLE 4

|  |  | Example 18 | Example 19 | Example 20 | Example 21 | Example 22 | Example 23 | Example 24 |
|---|---|---|---|---|---|---|---|---|
| Block copolymer | Styrene content of block copolymer (wt %) | 70 | 70 | 70 | 70 | 70 | 70 | 70 |
|  | Butadiene content of block copolymer (wt %) | 25 | 25 | 25 | 25 | 25 | 25 | 25 |
|  | Lactone content of block copolymer (wt %) | 5 | 5 | 5 | 5 | 5 | 5 | 5 |
| Content of block copolymer in the resin composition (wt %) |  | 50 | 80 | 80 | 90 | 80 | 100 | 90 |
| Styrene type resin | Content of GP-PS in the resin composition (wt %) | 20 | 20 | 20 | 10 | — | — | 10 |
|  | Content of HI-PS in the resin composition (wt %) | 30 | — | — | — | 20 | — | — |
| Content of antistatic agent (PHR) |  | 1.0 | 1.0 | 1.0 | 1.0 | 1.0 | 1.0 | 1.0 |
| Physical properties | Haze (%) | 7.4 | 6.8 | 8.5 | 12.3 | 9.3 | 7.6 | 15.8 |
|  | Surface resistivity (blank) ($\Omega$) | $2.7 \times 10^{10}$ | $2.3 \times 10^{10}$ | $3.0 \times 10^{10}$ | $2.7 \times 10^{10}$ | $2.0 \times 10^{10}$ | $2.8 \times 10^{10}$ | $2.9 \times 10^{10}$ |
|  | Surface resistivity (after wiping water off) ($\Omega$) | $8.1 \times 10^{10}$ | $6.5 \times 10^{10}$ | $7.6 \times 10^{10}$ | $7.3 \times 10^{10}$ | $5.8 \times 10^{10}$ | $3.6 \times 10^{11}$ | $8.2 \times 10^{10}$ |
|  | Vicat softening point (°C.) | 76 | 70 | 68 | 65 | 67 | 66 | 64 |
|  | Notched Izod impact strength (kg-cm/cm) | 2.0 | 2.4 | 2.4 | 3.8 | 2.0 | 2.2 | 3.6 |

TABLE 5

|  |  | Example 25 | Example 26 | Example 27 | Example 28 |
|---|---|---|---|---|---|
| Block copolymer | Styrene content of block copolymer (wt %) | 65 | 65 | 65 | 65 |
|  | Butadiene content of block copolymer (wt %) | 10 | 25 | 25 | 10 |
|  | Lactone content of block copolymer (wt %) | 25 | 10 | 10 | 25 |
| Content of block copolymer in the resin composition (wt %) |  | 30 | 80 | 80 | 10 |
| Content of MS resin in the resin composition (wt %) |  | 70 | — | 20 | — |
| Content of MBS resin in the resin composition (wt %) |  | — | 20 | — | 90 |
| Content of antistatic agent (PHR) |  | 1.0 | 1.0 | 1.0 | 1.0 |
| Physical properties | Haze (%) | 17.2 | 7.3 | 6.8 | 12.8 |
|  | Surface resistivity (blank) ($\Omega$) | $2.0 \times 10^{10}$ | $6.5 \times 10^{10}$ | $7.6 \times 10^{10}$ | $2.2 \times 10^{11}$ |
|  | Surface resistivity (after wiping off) ($\Omega$) | $2.1 \times 10^{11}$ | $3.4 \times 10^{11}$ | $4.5 \times 10^{11}$ | $6.9 \times 10^{11}$ |
|  | Vicat softening point (°C.) | 80 | 70 | 71 | 84 |

TABLE 6

|  |  | Comparative Example 5 | Comparative Example 6 | Comparative Example 7 | Comparative Example 8 | Comparative Example 9 |
|---|---|---|---|---|---|---|
| Block copolymer | Styrene content of block copolymer (wt %) | 75 | 10 | 10 | 75 | 75 |
|  | Butadiene content of block copolymer (wt %) | 25 | 80 | 10 | 25 | 25 |
|  | Lactone content of block copolymer (wt %) | — | 10 | 80 | — | — |
| Content of block copolymer in the resin composition (wt %) |  | — | 80 | 80 | — | — |
| Content of SBS block copolymer in the resin composition (wt %) |  | 72 | — | — | 80 | 80 |
| Content of polylactone in the resin composition (wt %) |  | 8 | — | — | — | — |
| Content of MS resin in the resin composition (wt %) |  | 20 | — | — | 20 | — |
| Content of MBS resin in the resin composition (wt %) |  | — | 20 | 20 | — | 20 |
| Content of antistatic agent (PHR) |  | 1.0 | 1.0 | 1.0 | 1.0 | 1.0 |
| Physical | Haze (%) | 89.7 | 35.2 | 38.7 | 4.0 | 4.5 |

TABLE 6-continued

| | | Comparative Example 5 | Comparative Example 6 | Comparative Example 7 | Comparative Example 8 | Comparative Example 9 |
|---|---|---|---|---|---|---|
| properties | Surface resistivity (blank) ($\Omega$) | $2.4 \times 10^{11}$ | $7.3 \times 10^{10}$ | $1.9 \times 10^{10}$ | $8.5 \times 10^{13}$ | $4.9 \times 10^{12}$ |
| | Surface resistivity (after wiping off) ($\Omega$) | $7.5 \times 10^{13}$ | $4.6 \times 10^{11}$ | $5.4 \times 10^{10}$ | $6.0 \times 10^{15}$ | $4.7 \times 10^{15}$ |
| | Vicat softening point (°C.) | 65 | 60 | 62 | 86 | 83 |

Measuring conditions

| | |
|---|---|
| Haze: | The haze of the 2 mm portion of the 3-stage plate was measured in accordance with ASTM D1003 |
| Surface resistivity: (blank) | In accordance with JIS K-6911, temperature: 23° C., humidity: 60% RH |
| Surface resistivity: (after wiping water off) | The sample was wiped ten times with absorbent cotton impregnated with water and then dried in air for 30 minutes. This cycle was repeated ten times, whereupon the surface resistivity was measured. In accordance with JIS K-6911, temperature: 23° C., humidity: 60% RH |
| Surface resistivity: (after wiping off) | The surface of a molded product was wiped off under a load of 50 g at a speed of one minute per one wiping, and the surface resistivity after wiping one thousand times was measured. In accordance with JIS K-6911, temperature: 23° C., humidity: 60% RH |
| Notched Izod impact strength: | In accordance with JIS K-6870 |

As shown in the foregoing Examples and Comparative Examples, the permanent antistatic resin composition of the present invention is excellent in the permanent antistatic properties as compared with the conventional antistatic resins. According to the present invention, it is possible to obtain such a resin composition which does not undergo deterioration with time.

What is claimed is:

1. A permanent antistatic resin composition which comprises 100 parts by weight of a block copolymer and from 0.1 to 2.0 parts by weight of an antistatic agent, said block copolymer comprising polymer blocks of a vinyl aromatic compound, polymer blocks of a conjugated diene compound and polymer blocks of a lactone compound, wherein the content of the vinyl aromatic compound is from 10 to 100% by weight and the content of the conjugated diene compound is from 0 to 90% by weight, provided that the sum of the vinyl aromatic compound and the conjugated diene compound is from 30 to 99% by weight, and the content of the lactone compound is from 1 to 70% by weight.

2. The permanent antistatic resin composition according to claim 1, wherein the content of the vinyl aromatic compound is from 15 to 85% by weight and the content of the conjugated diene compound is from 15 to 85% by weight.

3. The permanent antistatic resin composition according to claim 1, wherein the sum of the vinyl aromatic compound and the conjugated diene compound is from 30 to 90% by weight, and the content of the lactone compound is from 10 to 70% by weight.

4. The permanent antistatic resin composition according to claim 1, wherein the sum of the vinyl aromatic compound and the conjugated diene compound is from 60 to 90% by weight, and the content of the lactone compound is from 10 to 40% by weight.

5. The permanent antistatic resin composition according to claim 1, wherein the vinyl aromatic compound is styrene.

6. The permanent antistatic resin composition according to claim 1, wherein the conjugated diene compound is butadiene.

7. The permanent antistatic resin composition according to claim 1, wherein the block copolymer has a structural formula of $(A-B)_nA-C$ where A is a polymer chain made of the vinyl aromatic compound, B is a polymer chain made of the conjugated diene compound, C is a polymer chain made of the lactone compound, and n is an integer of from 1 to 20.

8. The permanent antistatic resin composition according to claim 1, wherein the lactone compound is one of $\beta$- to $\epsilon$-lactone compounds of the following formula:

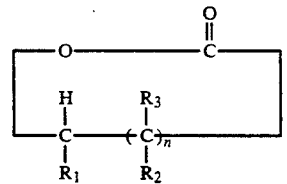

wherein each of $R_1$, $R_2$ and $R_3$ is H or a $C_1$-$C_8$ alkyl group, and n is an integer of from 1 to 5.

9. The permanent antistatic resin composition according to claim 1, wherein the lactone compound is $\epsilon$-caprolactone or dimethylpropiolactone.

10. The permanent antistatic resin composition according to claim 1, wherein the antistatic agent is an alkyl polyoxyethyleneamine or a sorbitan ester.

11. The permanent antistatic resin composition according to claim 1, wherein the amount of the antistatic agent is from 0.1 to 1.0 part by weight per 100 parts by weight of the block copolymer.

12. The permanent antistatic resin composition according to claim 1, wherein the amount of the antistatic agent is from 0.3 to 1.0 part by weight per 100 parts by weight of the block copolymer.

13. A permanent antistatic resin composition which comprises 100 parts by weight of a resin composition comprising a block copolymer and a styrene resin, and from 0.1 to 2.0 parts by weight of an antistatic agent, said block copolymer comprising polymer blocks of a vinyl aromatic compound, polymer blocks of a conjugated diene compound and polymer blocks of a lactone compound, wherein the content of the vinyl aromatic compound is from 10 to 100% by weight and the content of the conjugated diene compound is from 0 to 90% by weight, provided that the sum of the vinyl aromatic compound and the conjugated diene compound is from 30 to 99% by weight, and the content of the lactone compound is from 1 to 70% by weight.

14. The permanent antistatic resin composition according to claim 13, wherein the block copolymer is from 10 to 90% by weight and the styrene resin is from 10 to 90% by weight.

15. The permanent antistatic resin composition according to claim 13, wherein the content of the vinyl aromatic compound is from 15 to 85% by weight and the content of the conjugated diene compound is from 15 to 85% by weight.

16. The permanent antistatic resin composition according to claim 13, wherein the sum of the vinyl aromatic compound and the conjugated diene compound is from 30 to 90% by weight, and the content of the lactone compound is from 10 to 70% by weight.

17. The permanent antistatic resin composition according to claim 13, wherein the sum of the vinyl aromatic compound and the conjugated diene compound is from 60 to 90% by weight, and the content of the lactone compound is from 10 to 40% by weight.

18. The permanent antistatic resin composition according to claim 13, wherein the vinyl aromatic compound is styrene.

19. The permanent antistatic resin composition according to claim 13, wherein the conjugated diene compound is butadiene.

20. The permanent antistatic resin composition according to claim 13, wherein the block copolymer has a structural formula of $(A-B)_nA-C$ wherein A is a polymer chain made of the vinyl aromatic compound, B is a polymer chain made of the conjugated diene compound, C. is a polymer chain made of the lactone compound, and n is an integer of from 1 to 20.

21. The permanent antistatic resin composition according to claim 13, wherein the lactone compound is one of $\beta$- to $\epsilon$-lactone compounds of the following formula:

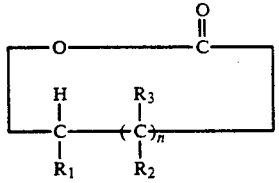

wherein each of $R_1$, $R_2$ and $R_3$ is H or a $C_1$-$C_8$ alkyl group, and n is an integer of from 1 to 5.

22. The permanent antistatic resin composition according to claim 13, wherein the lactone compound is $\epsilon$-caprolactone or dimethylpropiolactone.

23. The permanent antistatic resin composition according to claim 13, wherein the antistatic agent is an alkyl polyoxyethyleneamine or a sorbitan ester.

24. The permanent antistatic resin composition according to claim 13, wherein the amount of the antistatic agent is from 0.1 to 1.0 part by weight.

25. The permanent antistatic resin composition according to claim 13, wherein the amount of the antistatic agent is from 0.3 to 1.0 part by weight.

26. The permanent antistatic resin composition according to claim 13, wherein the styrene resin is a block copolymer resin selected from the group consisting of styrene-isoprene block copolymer resins, styrene-butadiene block copolymer resins and hydrides of such copolymer resins.

27. The permanent antistatic resin composition according to claim 13, wherein the styrene resin is a styrene-methyl methacrylate copolymer resin, or a resin composition comprising a styrene-methyl methacrylate copolymer resin and a butadiene graft copolymer resin.

28. The permanent antistatic resin composition according to claim 13, wherein the styrene resin is a general purpose polystyrene resin, or a styrene-butadiene graft copolymer resin.

29. A permanent antistatic resin composition which comprises 100 parts by weight of a block copolymer and from 0.1 to 20 parts by weight of an antistatic agent, said block copolymer comprising polymer blocks of a vinyl aromatic compound, polymer blocks of a conjugated diene compound and polymer blocks of a lactone compound, wherein the content of the vinyl aromatic compound is from 10 to 100% by weight and the content of the conjugated diene compound is from 0 to 90% by weight, provided that the sum of the vinyl aromatic compound and the conjugated diene compound is from 30 to 99% by weight, and the content of the lactone compound is from 1 to 70% by weight.

30. The permanent antistatic resin composition according to claim 29, wherein the content of the vinyl aromatic compound is from 15 to 85% by weight and the content of the conjugated diene compound is from 15 to 85% by weight.

31. The permanent antistatic resin composition according to claim 29, wherein the sum of the vinyl aromatic compound and the conjugated diene compound is from 30 to 90% by weight, and the content of the lactone compound is from 10 to 70% by weight.

32. The permanent antistatic resin composition according to claim 29, wherein the sum of the vinyl aromatic compound and the conjugated diene compound is from 60 to 90% by weight, and the content of the lactone compound is from 10 to 40% by weight.

33. The permanent antistatic resin composition according to claim 29, wherein the vinyl aromatic compound is styrene.

34. The permanent antistatic resin composition according to claim 29, wherein the conjugated diene compound is butadiene.

35. The permanent antistatic resin composition according to claim 29, wherein the block copolymer has a structural formula of $(A-B)_nA-C$ where A is a polymer chain made of the vinyl aromatic compound, B is a polymer chain made of the conjugated diene compound, C is a polymer chain made of the lactone compound, and n is an integer of from 1 to 20.

36. The permanent antistatic resin composition according to claim 29, wherein the lactone compound is one of $\beta$- to $\epsilon$-lactone compounds of the following formula:

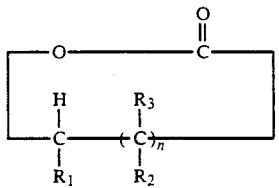

wherein each of $R_1$, $R_2$ and $R_3$ is H or a $C_1$–$C_8$ alkyl group, and n is an integer of from 1 to 5.

37. The permanent antistatic resin composition according to claim 29, wherein the lactone compound is ε-caprolactone or dimethylpropiolactone.

38. The permanent antistatic resin composition according to claim 29, wherein the antistatic agent is an alkyl polyoxyethyleneamine or a sorbitan ester.

* * * * *

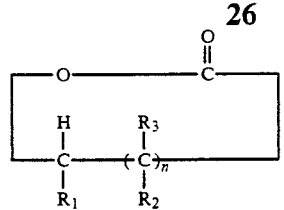

wherein each of $R_1$, $R_2$ and $R_3$ is H or a $C_1$–$C_8$ alkyl group, and n is an integer of from 1 to 5.

37. The permanent antistatic resin composition according to claim 29, wherein the lactone compound is ε-caprolactone or dimethylpropiolactone.

38. The permanent antistatic resin composition according to claim 29, wherein the antistatic agent is an alkyl polyoxyethyleneamine or a sorbitan ester.

* * * * *